(12) United States Patent
Akutsu et al.

(10) Patent No.: US 8,503,843 B2
(45) Date of Patent: Aug. 6, 2013

(54) HYBRID INTEGRATED OPTICAL MODULE

(75) Inventors: Takeshi Akutsu, Tokyo (JP); Junichi Hasegawa, Tokyo (JP); Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 296 days.

(21) Appl. No.: 12/942,481

(22) Filed: Nov. 9, 2010

(65) Prior Publication Data

US 2011/0110622 A1 May 12, 2011

(30) Foreign Application Priority Data

Nov. 10, 2009 (JP) ................. 2009-256670

(51) Int. Cl.
*G02B 6/26* (2006.01)
*G02B 6/12* (2006.01)

(52) U.S. Cl.
USPC ................. 385/50; 385/14; 385/38

(58) Field of Classification Search
None
See application file for complete search history.

(56) References Cited

U.S. PATENT DOCUMENTS

| 5,432,877 A * | 7/1995 | Sun et al. ............ 385/33 |
| 2005/0063639 A1 * | 3/2005 | Hsu et al. ............ 385/16 |
| 2011/0085761 A1 | 4/2011 | Nara et al. |

FOREIGN PATENT DOCUMENTS

| EP | 0274199 A2 * | 7/1988 |
| JP | 2-291510 A | 12/1990 |
| JP | 4-24981 A | 1/1992 |
| JP | 5-150127 A * | 6/1993 |
| JP | 6-167627 A * | 6/1994 |
| JP | 2000-275480 | 10/2000 |
| JP | 2003-287647 A * | 10/2003 |
| JP | 2004-151411 A | 5/2004 |
| JP | 2006-293091 A | 10/2006 |
| JP | 2007-133011 | 5/2007 |
| JP | 2008-250041 A | 10/2008 |
| JP | 2009-93093 A | 4/2009 |

OTHER PUBLICATIONS

U.S. Appl. No. 13/409,556, Mar. 1, 2012, Inoue, et al.
Office Action issued Dec. 21, 2012, in Japanese Patent Application No. 2009-256670 with English translation.

* cited by examiner

*Primary Examiner* — Mike Stahl
(74) *Attorney, Agent, or Firm* — Oblon, Spivak, McClelland, Maier & Neustadt, L.L.P.

(57) ABSTRACT

The present invention provides a hybrid integrated optical module having a high coupling efficiency by suppressing a connection loss between waveguides. A hybrid integrated optical module according to an embodiment of the present invention is an optical module which integrates a semiconductor chip and a PLC chip. The semiconductor chip has a semiconductor waveguide and is mounted on a Si bench. The PLC chip includes a PLC substrate and an optical waveguide formed on the PLC substrate. An end face of the semiconductor chip protrudes from an end face of the Si bench toward the PLC chip side by a protrusion amount X. Gap adjustment (adjustment of a distance D) between the semiconductor waveguide and the optical waveguide becomes possible by setting a position where the end face of the semiconductor chip is brought into contact with an end face of the PLC chip to be a reference position (zero point).

8 Claims, 7 Drawing Sheets

HYBRID INTEGRATED OPTICAL MODULE

BACKGROUND OF THE INVENTION

1. Field of the Invention

The present invention relates to a hybrid integrated optical module which integrates a first waveguide device having a semiconductor waveguide and is mounted on a first substrate, and a second waveguide device.

2. Description of the Related Art

Along with the spread and the progress of an optical communication network, an optical component to be used in an optical communication system has been progressing to have a high functionality. The optical component includes an active optical component to emit or receive signal light, a passive optical component to branch/combine or to de-multiplex/multiplex the signal light, an optical fiber used for a signal light transmission line, and the like, and the need of a high functionality and a low cost is increased for each of the optical components. Among them, the main active optical components is a semiconductor material based device such as a semiconductor laser element and a semiconductor light receiving element, and technology development is being promoted for this device. The active optical component based on the semiconductor material has an advantage of realizing an optical amplification function, a high speed operation, and a compact integration. Meanwhile, for the passive optical component, a planar lightwave circuit (PLC) having an optical waveguide based on silica-based material is available as a product. The PLC has an advantage of realizing a low-loss optical waveguide without polarization dependence.

While each of the active optical component and the passive optical component has been improved so far in the performance thereof as a single component, the need of a highly functional optical component having both of the above advantages is increasing along with the higher level need caused by the progress of the optical communication system. Accordingly, development is being promoted for a hybrid integrated optical module which combines the active optical component such as the semiconductor laser element and the PLC.

Japanese Patent Application Laid-Open Publication No. 2007-133011 discloses an optical module provided with a substrate, an optical waveguide and an optical element which are disposed on the substrate and optically coupled with each other, and a transformable stage which supports the optical element and changes the height thereof according to a load. By applying the load in the height direction of the transformable stage to adjust the height thereof, the height of the optical element supported by the transformable stage is adjusted.

Further, a hybrid integrated optical module optically combining different kinds of waveguide is disclosed in a technique disclosed by Japanese Patent Application Laid-Open Publication No. 2000-275480, for example. This conventional technique optically couples an optical waveguide end portion of an optical element to an optical waveguide end portion of an optical waveguide substrate, so as to cause both of the waveguides to be inclined obliquely against each other, in a hybrid integrated optical module mounting the optical waveguide substrate and the optical element on an optical component mounting substrate.

Meanwhile, in the conventional technique of above Japanese Patent Application Laid-Open Publication No. 2007-133011, a position shift of the optical element in the height direction (Y direction) can be adjusted but nothing is described about position alignment of the optical element in the horizontal direction (X direction) and distance adjustment in the Z direction which adjusts the distance between the optical waveguide and the light-emitting element to a certain distance (Z direction distance). Further, the conventional technique of above Japanese Patent Application Laid-Open Publication No. 2000-275480 performs passive alignment by using respective alignment marks provided to the optical component mounting substrate, the optical element, and the optical waveguide substrate. However, for realizing an optical module having a high coupling efficiency by suppressing a connection loss between the waveguides, it is preferable to perform active alignment including gap adjustment so as to have a certain optimal distance (gap) between the waveguides.

Further, when, for optically coupling the respective waveguides of a semiconductor device and a silica-based PLC device, the gap between the waveguides is adjusted from a zero point where both devices contact each other at the respective end faces, there arises a problem that the shape of the end face of the semiconductor device affects the gap adjustment between the waveguides in a configuration in which the semiconductor device is mounted on an optical bench.

SUMMARY OF THE INVENTION

The present invention aims at providing a hybrid integrated optical module having a high coupling efficiency by suppressing a connection loss between waveguides.

A first aspect of the present invention is a hybrid integrated optical module, comprising: a first waveguide device having a waveguide and mounted on a first substrate; and a second waveguide device having a waveguide and mounted on a second substrate which is different from the first substrate, wherein the first waveguide device and the second waveguide device are integrated and the waveguide of the first waveguide device and the waveguide of the second waveguide device are separated by a certain distance to be optically coupled with each other, and an end face of the first waveguide device, the end face being to be optically connected to the second waveguide device, protrudes from an end face of the first substrate.

Another aspect of the present invention is a manufacturing method of a hybrid integrated optical module which integrates a first waveguide device having a waveguide and mounted on a first substrate and a second waveguide device having a waveguide and mounted on a second substrate different from the first substrate, the method comprising the steps of: mounting the first waveguide device on the first substrate so that one end face of the first waveguide device protrudes from one end face of the first substrate; bringing the protruded end face of the first waveguide device into contact with one end face of the second waveguide device; and adjusting a distance between the waveguide of the first waveguide device and the waveguide of the second waveguide device, by setting a position where the respective end faces of the first and second waveguide devices are brought into contact with each other to be a reference position, and by moving the first waveguide device and the second waveguide device relatively from the reference position so as to separate the contacting end faces from each other.

DETAILED DESCRIPTION OF THE INVENTION

Figure 1:
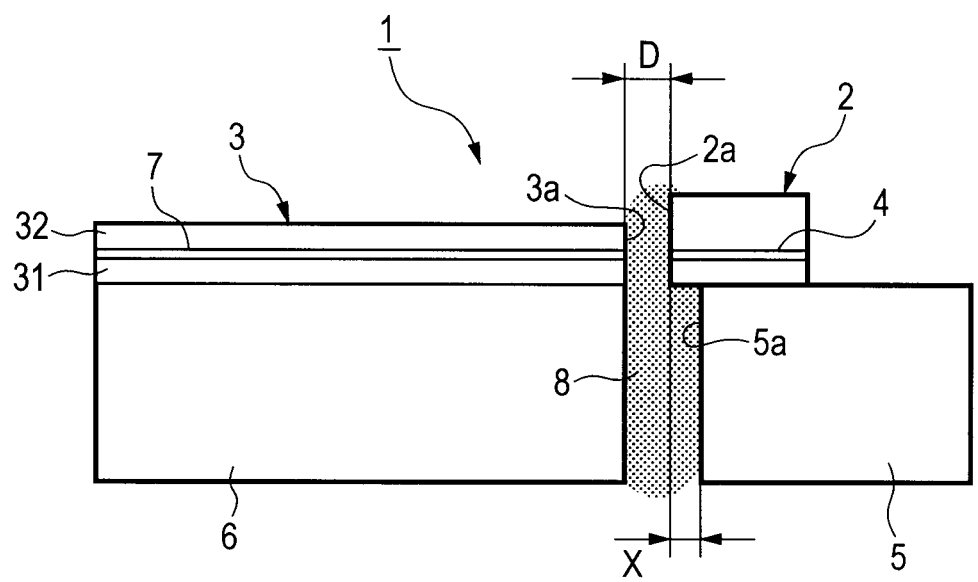
FIG. 1 is a conceptual diagram showing a basic configuration of a hybrid integrated optical module according to a first embodiment of the present invention.
Figure 2:
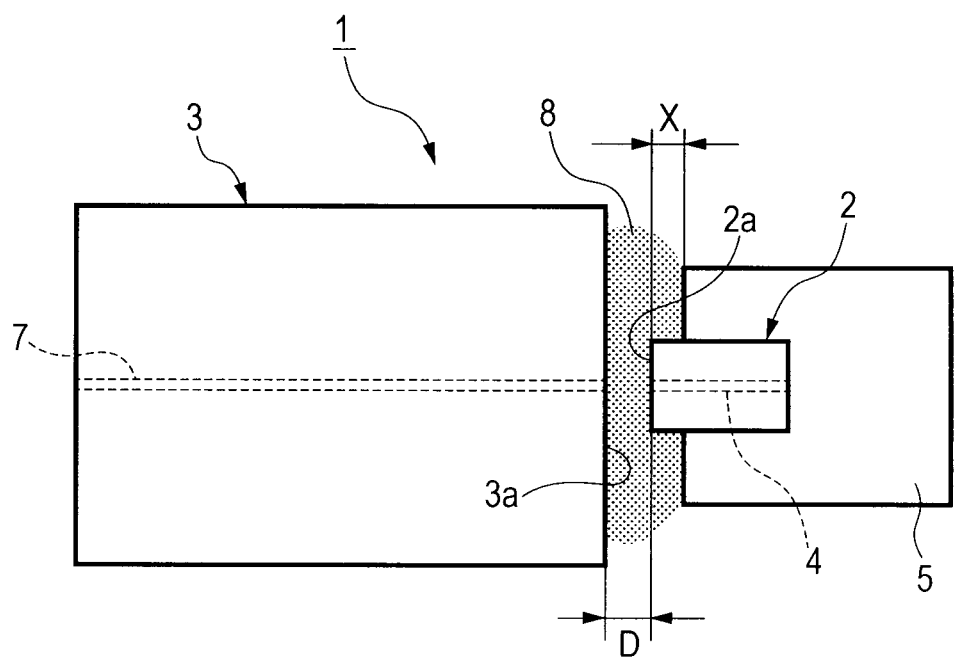
FIG. 2 is a plan view showing the hybrid integrated optical module shown in FIG. 1.

Hereinafter, embodiments implementing the present invention will be explained with reference to the drawings. Note that the same part is denoted by the same reference numeral or symbol and repeated description thereof will be omitted, in the explanation for each of the embodiments First Embodiment First, a hybrid integrated optical module 1 according to a first embodiment of the present invention will be explained according to FIG. 1 and FIG. 2. FIG. 1 is a conceptual diagram showing a basic configuration of the hybrid integrated optical module 1 and a cross-section thereof.

The hybrid integrated optical module 1 is an optical module integrating a semiconductor waveguide device 2 as a first waveguide device and a planar lightwave circuit chip 3 as a second waveguide device.

The semiconductor waveguide device (hereinafter, called "semiconductor chip") 2 has a semiconductor waveguide 4 and is mounted on a silicon (Si) bench 5 as a first substrate.

The planar lightwave circuit chip (hereinafter, called "PLC chip") 3 is provided with a PLC substrate 6 as a second substrate and an optical waveguide 7 formed on the PLC substrate 6. The PLC substrate 6 is a substrate made of silicon, silica, or the like. The PLC chip 3 has an optical waveguide 7 formed on the PLC substrate 6 from a silica-based or polymer-based material by a combination of an optical fiber manufacturing technique and a semiconductor fine processing technique.

Note that, instead of the PLC chip 3, an LN chip having an optical waveguide configured with an LN waveguide formed on a lithium niobate ($LiNbO_3$:LN) substrate may be used for the second waveguide device.

This PLC chip 3, for example, a PLC chip having a silica-based optical waveguide 7 is specifically fabricated as follows.

A silica material ($SiO_2$-based glass particle) which becomes a lower clad layer and a core layer is deposited on the PLC substrate 6 such as a silicon substrate by the flame hydrolysis deposition (FHD) method and is heated and melted to form a transparent glass film. After that, a desired optical waveguide is formed by photolithography and reactive ion etching, and an upper clad layer is formed by using the FHD method again. In FIG. 1, a clad layer including a lower clad layer 31 and an upper clad layer 32 is formed on the PLC substrate 6, and the optical waveguide 7 is formed as the core layer within this clad layer.

Further, in the hybrid integrated optical module 1, an end face 2a of the semiconductor chip 2 protrudes from an end face 5a of the Si bench 5 toward the PLC chip 3 side by a protrusion amount X. The protrusion amount X is approximately 5 to 10 μm, for example. Then, the semiconductor waveguide 4 and the optical waveguide 7 are separated by a certain distance (gap) D to be coupled optically (optical connection) with each other. Thereby, a connection loss between the waveguides (between the semiconductor waveguide 4 and the optical waveguide 7) is suppressed and the hybrid integrated optical module 1 having a high coupling efficiency is obtained.

Further, in the hybrid integrated optical module 1, the semiconductor chip 2 and the PLC chip 3, as well as the Si bench 5 and the PLC substrate 6 are made to adhere to each other with UV curable adhesive 8, respectively.

The present embodiment uses an end-face emission type semiconductor laser element having a structure for outputting light from a cleaved end face, for example, as the semiconductor chip 2. This light output end face (end face 2a) of the semiconductor laser element protrudes from the end face 5a of the Si bench 5.

Note that a wave guide type semiconductor light receiving element where light is incident from an end face may be used as the semiconductor chip 2. In this case, the light incident end face (end face 2a) of the semiconductor light receiving element is configured to protrude from the end face 5a of the Si bench 5.

(Manufacturing Method of the Integrated Optical Circuit Module 1)

A manufacturing method of the above integrated optical circuit module 1 will be explained according to FIG. 3.

Figure 3A:
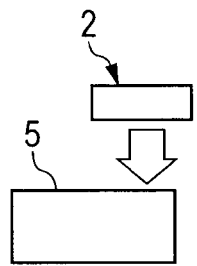
FIG. 3A to FIG. 3F are diagrams showing a manufacturing method of the hybrid integrated optical module shown in FIG. 1.

(Step 1) First, the semiconductor chip 2 and the Si bench 5 are prepared (refer to FIG. 3A).

Figure 3B:
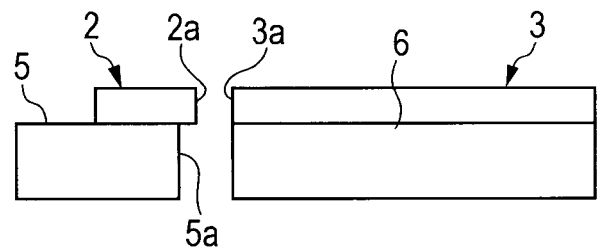

(Step 2) Next, die bonding (solder mounting) is performed for bonding the semiconductor chip 2 to the Si bench 5 so as to cause the end face 2a of the semiconductor chip 2 to protrude from the end face 5a of the Si bench 5 toward the PLC chip 3 side by a protrusion amount X (refer to FIG. 1) (refer to FIGS. 3A and 3B).

Figure 3C:
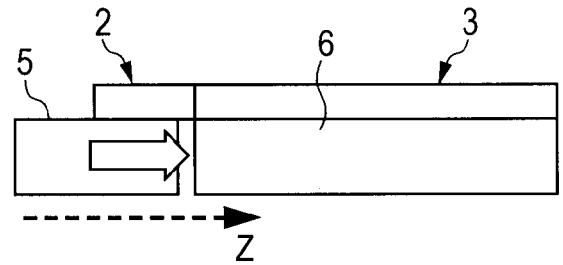

(Step 3) Next, the Si bench 5 and the PLC substrate 6 of the PLC chip 3 are fixed onto different stages, respectively (illustration is omitted) and the Si bench 5 and the PLC substrate 6 are moved relatively in the Z direction, and then the end face 2a of the semiconductor chip 2 (end face protruding toward the PLC chip 3 side) is brought into contact with an end face 3a of the PLC chip 3, (refer to FIG. 3C).

This contact position is set to be a reference position (zero point).

Figure 3D:
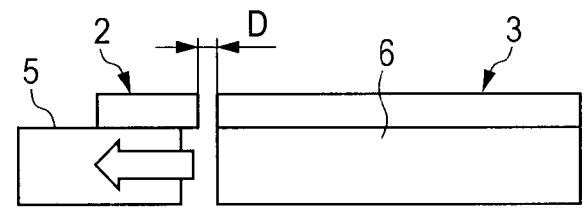

(Step 4) Next, the Si bench 5 and the PLC substrate 6 are moved relatively in the Z direction and the semiconductor chip 2 is moved by a distance D in the reverse direction from the reference position for gap adjustment (refer to FIG. 3D).

Figure 3E:
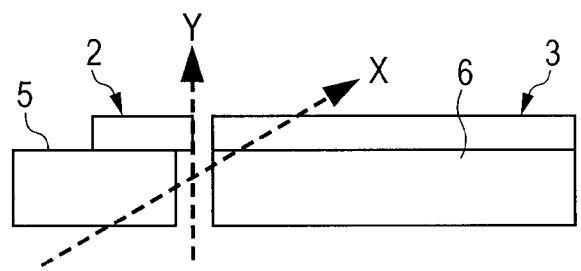

(Step 5) Next, active alignment is performed between the semiconductor waveguide 4 (refer to FIG. 1) of the semiconductor chip 2 and the optical waveguide 7 (refer to FIG. 1) of the PLC chip 3 (refer to FIG. 3E).

In this active alignment, light is actually made to transmit through the semiconductor waveguide 4 and the optical waveguide 7 and the transmitted light is received by a light receiving element (illustration is omitted), and then the alignment of the semiconductor waveguide 4 and the optical waveguide 7 is performed in the X direction (horizontal direction) and the Y direction (vertical direction) so as to maximize the strength of the transmitted light.

Figure 3F:
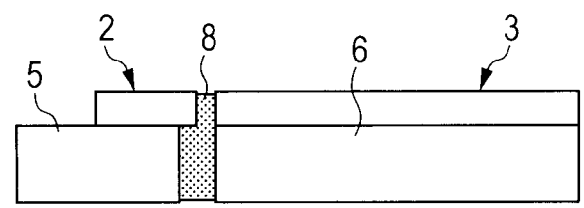

(Step 6) Next, the UV curable adhesive 8 is filled between the semiconductor chip 2 and the PLC chip 3 and between the Si bench 5 and the PLC substrate 6, and the UV curable adhesive 8 is irradiated with UV light (ultraviolet light) and the UV curable adhesive 8 is cured (refer to FIG. 3F).

Thereby, the semiconductor chip 2 and the PLC chip 3 as well as the Si bench 5 and the PLC substrate 6 are made to adhere to each other by the UV curable adhesive 8, respectively. In this manner, in a state in which the semiconductor waveguide 4 and the optical waveguide 7 are separated by a certain distance (gap) D to be coupled with each other, the hybrid integrated optical module 1 integrating the semiconductor chip 2 and the PLC chip 3 is fabricated.

The integrated optical circuit module 1 according to the first embodiment has the following technical functions and technical advantages. (1) The end face 2a of the semiconductor chip 2 having the semiconductor waveguide 4 protrudes from the end face 5a of the Si bench 5, and thereby it becomes possible to perform the gap adjustment (adjustment of the distance D) between the semiconductor waveguide 4 and the optical waveguide 7 by setting the position where the end face 2a of the semiconductor chip 2 is brought into contact with the end face 3a of the PLC chip 3 to be the reference position (zero point). Thereby, it is possible to perform the gap adjustment accurately to realize a preliminarily set distance D without being affected by the shape of the end face 5a of the Si bench 5, when integrating the semiconductor chip 2 and the PLC chip 3. Accordingly, it is possible to realize the hybrid integrated optical module 1 having a high coupling efficiency by suppressing the connection loss between the waveguides.

(2) It becomes possible to perform the gap adjustment by setting the position where the end face 2a of the semiconductor chip 2 is brought into contact with the end face 3a of the PLC chip 3 to be the reference position (zero point), and thereby the semiconductor waveguide 4 and the optical waveguide 7 can be coupled with each other by a certain distance D even when the protrusion amount X (refer to FIGS. 1 and 2) of the end face 2a varies widely. Accordingly, it is possible to reduce variation of the connection loss between the waveguides.

Figure 4:
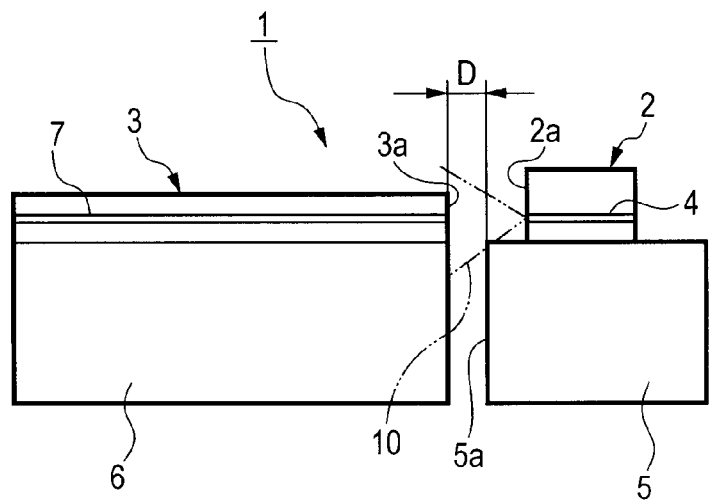
FIG. 4 is an explanatory diagram showing a state in which output light from a semiconductor waveguide or incident light to the semiconductor waveguide is vignetted by a Si bench in a conventional hybrid integrated optical module.

(3) The end face 2a of the semiconductor chip 2 protrudes from the end face 5a of the Si bench 5, and thereby the output light from the semiconductor waveguide 4 or the incident light to the semiconductor waveguide 4 is not vignetted by the Si bench 5. FIG. 4 shows a state in which the output light from the semiconductor waveguide 4 or the incident light 10 to the semiconductor waveguide 4 is vignetted by an upper part of the Si bench 5 on the PLC chip 3 side, in the conventional hybrid integrated optical module in which the end face 2a of the semiconductor chip 2 recedes from the end face 5a of the Si bench 5. The present embodiment can prevent such vignetting by the Si bench 5 from being caused.

Note that the "vignetting" here indicates the state that the output light from the semiconductor waveguide 4 or the incident light 10 to the semiconductor waveguide 4 is blocked by the upper part of the Si bench 5 on the PLC chip 3 side and an extra coupling loss is caused.

Second Embodiment

Figure 5:
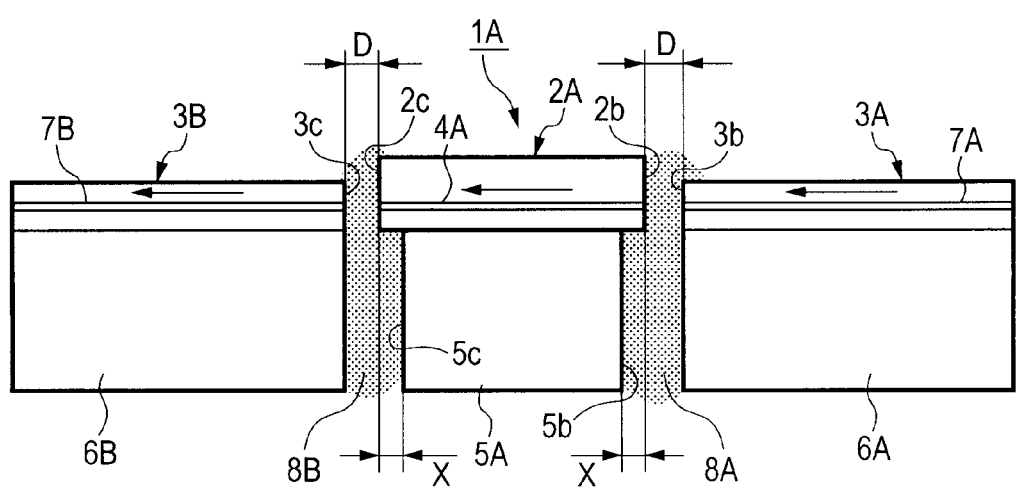
FIG. 5 is a conceptual diagram showing a basic configuration of a hybrid integrated optical module according to a second embodiment of the present invention.

Next, a hybrid integrated optical module 1A according to a second embodiment of the present invention will be explained with reference to FIG. 5 and FIG. 6. FIG. 5 is a conceptual diagram showing a basic configuration of the hybrid integrated optical module 1A and a cross section thereof.

The hybrid integrated optical module 1A is an optical module integrating a semiconductor chip 2A as a first waveguide device and two PLC chips 3A and 3B as second waveguide devices.

The semiconductor chip 2A has a semiconductor waveguide 4A which can transmit light from an input side to an output side and is mounted on a Si bench 5A. The semiconductor waveguide 4A extends from one end face 2b of the semiconductor chip 2A to the other end face 2c thereof.

The PLC chip 3A includes a PLC substrate 6A as a second substrate and an optical waveguide 7A formed on the PLC substrate 6A. Further, the PLC chip 3B includes a PLC substrate 6B as a second substrate and an optical waveguide 7B formed on the PLC substrate 6B.

Figure 6:
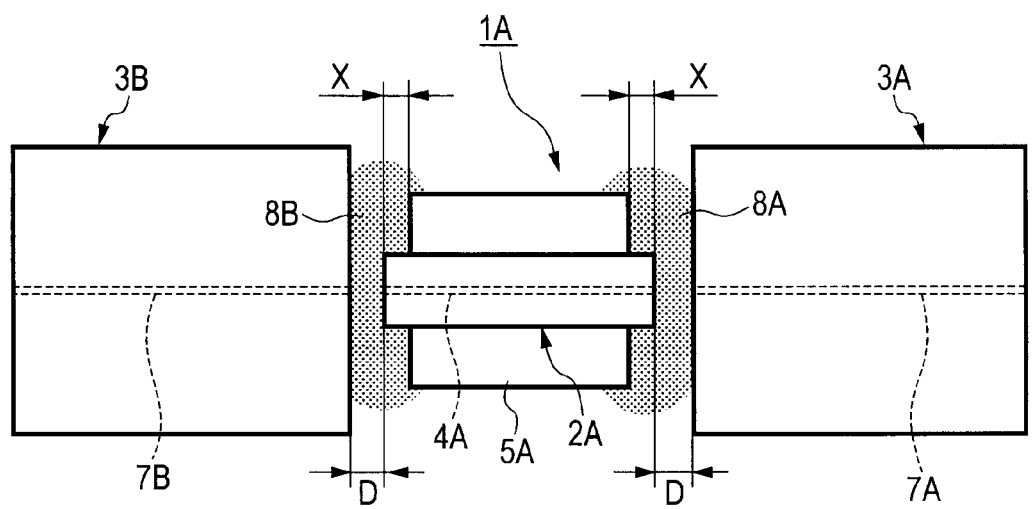
FIG. 6 is a plan view showing the hybrid integrated optical module shown in FIG. 5.

Further, in the hybrid integrated optical module 1A, both end faces of the semiconductor chip 2A protrude from both end faces of the Si bench 5A, respectively, by a protrusion amount X (refer to FIG. 5 and FIG. 6). That is, the one end face 2b of the semiconductor chip 2A protrudes from the one end face 5b of the Si bench 5A toward the PLC chip 3A side by the protrusion amount X. Further, the other end face 2c of the semiconductor chip 2A protrudes from the other end face 5c of the Si bench 5A toward the PLC chip 3B side by the protrusion amount X.

Here, the present embodiment uses a semiconductor waveguide element such as a semiconductor optical amplifier and an electro-absorption modulator as the semiconductor chip 2A having the semiconductor waveguide 4A which can transmit light from the input side to the output side.

The semiconductor optical amplifier (SOA) is an amplifier amplifying an optical signal directly in a state of light without converting the optical signal into an electrical signal. Further, the electro-absorption (EA) modulator is a device using the electro-absorption effect of a semiconductor and can convert continuous light incident from one end of a waveguide into an optical ON/OFF signal by causing the input light to be transmitted/absorbed correspondingly to ON/OFF of an electrical signal.

Further, the semiconductor waveguide 4A and the optical waveguide 7A, as well as the semiconductor waveguide 4A and the optical waveguide 7B, are separated by a certain distance D to be coupled with each other, respectively.

Then, in the hybrid integrated optical module 1A, the semiconductor chip 2A and the PLC chip 3A, as well as the Si bench 5A and the PLC substrate 6A, are made to adhere to each other with the UV curable adhesive 8A, respectively. Further, the semiconductor chip 2A and the PLC chip 3B, as well as the Si bench 5A and the PLC substrate 6B are made to adhere to each other with the UV curable adhesive 8B, respectively.

When the hybrid integrated optical module 1A is fabricated, gap adjustment is performed so as to separate the semiconductor waveguide 4A and the optical waveguide 7A, as well as the semiconductor waveguide 4A and the optical waveguide 7B, by a certain distance D, respectively as with the above (Step 4).

After this adjustment, active alignment between the semiconductor waveguide 4A of the semiconductor chip 2A and the optical waveguide 7A of the PLC chip 3A, and active alignment between the semiconductor waveguide 4A and the optical waveguide 7B of the PLC chip 3B, are performed respectively as with the above (step 5).

After this alignment, the UV curable adhesive 8A is filled between the semiconductor chip 2A and the PLC chip 3A and between the Si bench 5A and the PLC substrate 6A, and the UV curable adhesive 8A is irradiated with UV light and the UV curable adhesive 8A is cured, as with the above (Step 6). Further, the UV curable adhesive 8B is filled between the semiconductor chip 2A and the PLC chip 3B and between the Si bench 5A and the PLC substrate 6B, and the UV curable adhesive 8B is irradiated with UV light and the UV curable adhesive 8B is cured.

In this manner, the hybrid integrated optical module 1A is fabricated, wherein the semiconductor waveguide 4A and the optical waveguide 7A, as well as the semiconductor waveguide 4A and the optical waveguide 7B are separated by a certain distance D to be coupled to each other, respectively.

In the integrated optical circuit module 1 according to the second embodiment, the one end face 2b of the semiconductor chip 2A protrudes from the one end face 5b of the Si bench 5A, and thereby it becomes possible to perform the gap adjustment (adjustment of the distance D) between the semiconductor waveguide 4A and the optical waveguide 7A by setting a position where the end face 2b is brought into contact with the end face 3b of the PLC chip 3A to be a reference position (zero point). At the same time, the other end face 2c of the semiconductor chip 2A protrudes from the other end face 5c of the Si bench 5A and thereby it becomes possible to perform the gap adjustment between the semiconductor waveguide 4A and the optical waveguide 7B by setting a position where the end face 2c is brought into contact with the end face 3c of the PLC chip 3B to be a reference position (zero point). Accordingly, it is possible to realize a hybrid integrated optical module 1A having a high coupling efficiency by suppressing the connection loss between the waveguides in a configuration in which the PLC chips 3A and 3B are disposed on both sides of the semiconductor chip 2A.

Third Embodiment

Next, a hybrid integrated optical module 1B according to a third embodiment of the present invention will be explained with reference to FIG. 7 to FIG. 9.

Figure 7:
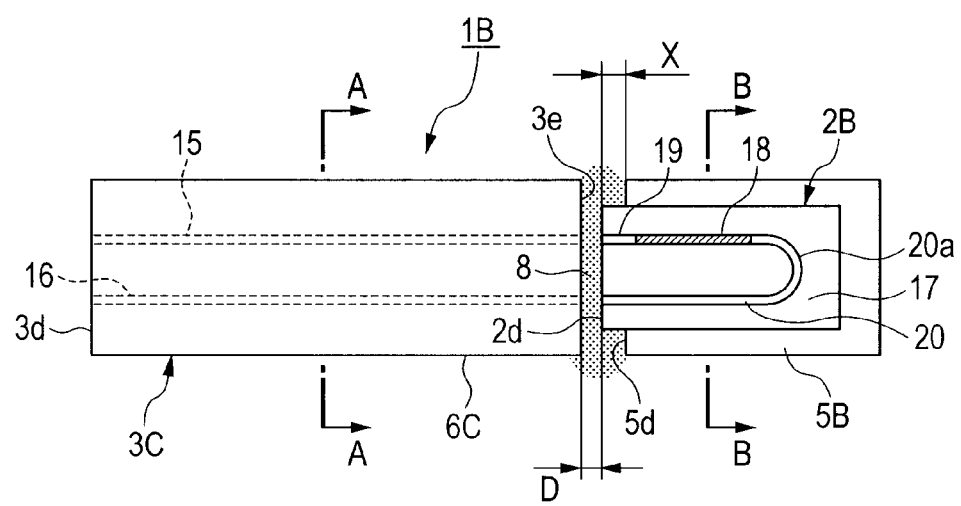
FIG. 7 is a plan view showing a basic configuration of a hybrid integrated optical module according to a third embodiment of the present invention.

FIG. 7 is a plan view showing a basic configuration of the hybrid integrated optical module 1B. FIG. 8 is a cross-sectional view taken along the line A-A of FIG. 7 and shows a cross-sectional structure of a PLC chip 3C. Further, FIG. 9 is a cross-sectional view taken along the line B-B of FIG. 7 and shows a cross-sectional structure of a semiconductor waveguide part of a semiconductor chip 2B.

The hybrid integrated optical module 1B is an optical module integrating a semiconductor chip 2B as a first waveguide device which is fixed on a silicon substrate 5B as a first substrate and a PLC chip 3C as a second waveguide device as shown in FIG. 7.

Figure 8:
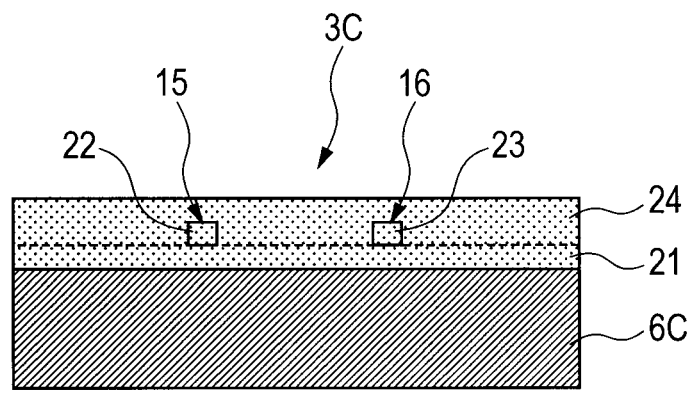
FIG. 8 is a cross-sectional view taken along the line A-A of FIG. 7.

The PLC chip 3C includes a PLC substrate 6C and two linear optical waveguides 15 and 16 formed on the PLC substrate 6C as shown in FIG. 7 and FIG. 8. Each of the optical waveguides 15 and 16 extends from one end face 3d of the PLC chip 3C to the other end face 3e thereof.

Figure 9:
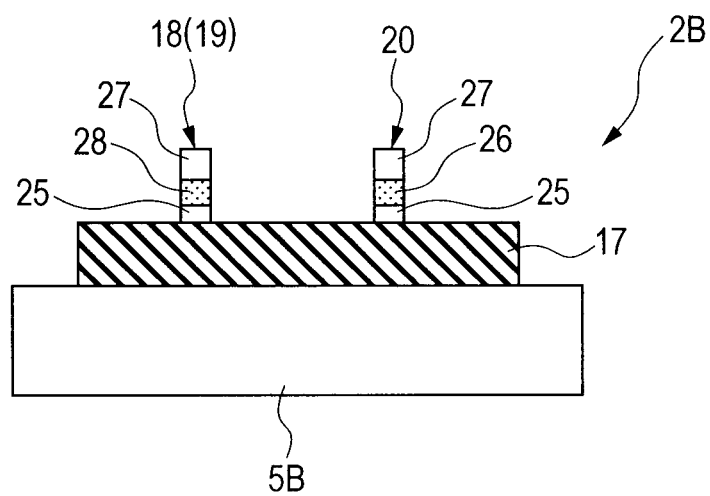
FIG. 9 is a cross-sectional view taken along the line B-B of FIG. 7.

The semiconductor chip 2B includes a semiconductor substrate 17 which is fixed on the silicon substrate 5B, and a semiconductor optical amplifier (SOA) 18 as an element which is formed on the semiconductor substrate 17 and can transmit light from an input side to an output side, as shown in FIG. 7 and FIG. 9. Further, an input-side semiconductor waveguide 19 and an output-side semiconductor waveguide 20 are formed on the semiconductor substrate 17 and connected to the input side and the output side of the SOA 18, respectively. The output-side semiconductor waveguide 20 has a folded-back portion 20a which is folded back on the semiconductor substrate 17.

In this manner, the folded-back portion 20a is provided to one of the two semiconductor waveguides (output-side semiconductor waveguide 20) which are connected to the input side and the output side of the SOA 18, respectively, and thereby each end of both semiconductor waveguides 19 and 20 comes to exist on the same one end face of the semiconductor substrate 17 (end face 2d of the semiconductor chip 2B). Accordingly, light output from the optical waveguide 15, for example, enters the input-side semiconductor waveguide 19, then enters the output-side semiconductor waveguide 20 after having passed through the semiconductor waveguide 19 and an active layer 28 of the SOA 18, is folded-back at the folded-back portion 20a while propagating through the semiconductor waveguide 20, and is output from the semiconductor waveguide 20 to the optical waveguide 16. Here, the semiconductor chip 2B may employ the electro-absorption (EA) modulator as an element formed on the semiconductor substrate 17 instead of the SOA 18.

Further, in the hybrid integrated optical module 1B, an end face 2d of the semiconductor chip 2B protrudes from an end face 5d of the Si substrate 5B toward the PLC chip 3C side by a protrusion amount X, as shown in FIG. 7.

The PLC chip 3C, as shown in FIG. 8, has a PLC substrate 6C, a lower clad layer 21 formed on the PLC substrate 6C, core layers 22 and 23 formed on the lower clad layer 21, and an upper clad layer 24 formed on the lower clad layer 21 and the core layers 22 and 23. In such a PLC chip 3C, the optical waveguides 15 and 16 have the core layers 22 and 23 each having a high refractive index and serving as a light path, and the clad layers 21 and 24 each having a low refractive index and being a peripheral part of the core layers, respectively. In the present embodiment, for example, the optical waveguides 15 and 16 are silica waveguides in which the lower clad layer 21, the core layers 22 and 23, and the lower clad layer 24 are formed from a silica-based material. In such optical waveguides 15 and 16, a typical refractive index difference between the core layers 22 and 23 and the clad layers 21 and 24 is about several percent at a maximum.

Such a PLC chip 3C is fabricated in the following method. Glass particles which become the lower clad layer 21 and the core layers 22 and 23 are deposited on the PLC substrate 6C by the flame hydrolysis deposition (FHD) method and are heated and melted to form transparent glass films. After that, a desired optical waveguide pattern is formed by photolithography and reactive ion etching (RIE) and the upper clad layer 24 is formed by using the FHD method again.

Each of the input-side semiconductor waveguide 19 and the output-side semiconductor waveguide 20 formed on the semiconductor substrate 17 includes a lower clad layer 25 formed on the semiconductor substrate 17, a core layer 26 formed on the lower clad layer 25, and an upper clad layer 27 formed on the core layer 26 as shown in FIG. 7 and FIG. 9.

Each of the semiconductor substrate 17, the lower clad layer 25, and the upper clad layer 27 is formed from a compound semiconductor InP, and the core layer 26 is formed from a compound semiconductor InGaAsP. Further, the semiconductor waveguide 19 is a linear waveguide formed in a high mesa structure. The semiconductor waveguide 20 is formed in a high mesa structure and has the folded-back portion 20a.

Note that, while each of the input-side semiconductor waveguide 19, the SOA 18, and the output-side semiconductor waveguide 20 is formed in the high mesa structure in the present embodiment, only the folded-back portion 20a may be a waveguide having the high mesa structure and each of the output-side semiconductor waveguide 20 connected to the folded-back portion 20a, the input-side semiconductor waveguide 19, and the SOA 18 may be a waveguide having an embedded structure. In this case, the gain characteristic of the SOA 18 is improved.

While the semiconductor waveguide 20 may have an embedded structure or a low mesa structure, it is preferable to employ the high mesa structure as in the present example. In this case, the refractive index difference between the core layer 26 and air on both sides thereof becomes so large as, for example, 40 percent or larger, and thereby it is possible to keep a low loss even when the curvature radius of the folded-back portion 20a is made smaller.

The SOA 18 formed on the semiconductor substrate 17 is, as shown in FIG. 7 and FIG. 9, different from the semiconductor waveguides 19 and 20 in that the SOA 18 has an active layer 28 formed from an optical amplification medium, for the core layers 26 of the semiconductor waveguides 19 and 20.

With such a configuration, for example, light output from the optical waveguide 15 enters the input-side semiconductor waveguide 19, propagates through the core layer 26 thereof, passes through the active layer 28 of the SOA 18, is folded back at the folded-back portion 20a while propagating through the core layer 26 of the semiconductor waveguide 20, and is output from the semiconductor waveguide 20 to the optical waveguide 16.

Further, the SOA 18 and the semiconductor waveguides 19 and 20 are formed on the semiconductor substrate 17 such that the light propagating through the core layer 26 of the semiconductor waveguide 19 passes through the active layer 28 of the SOA 18 and the core layer 26 of the semiconductor waveguide 20. The SOA 18 is used as a semiconductor gate which turns ON/OFF the incident light by ON/OFF of an injection current, for example.

The integrated optical circuit module 1B according to the third embodiment has the following technical functions and technical advantages.

(1) Since the end face 2d of the semiconductor chip 2B protrudes from the end face 5d of the silicon substrate 5B, it becomes possible to perform the gap adjustment between the semiconductor waveguides 19 and 20 and the optical waveguides 15 and 16, respectively, by setting a position where the end face 2d is brought into contact with the end face 3e of the PLC chip 3C to be a reference position (zero point). Thereby, it is possible to perform the gap adjustment accurately without being affected by the shape of the end face 5d of the silicon substrate 5B. Accordingly, it is possible to realize the hybrid integrated optical module 1B having a high coupling efficiency by suppressing the connection loss between the waveguides.

(2) The input-side semiconductor waveguide 19 and the output-side semiconductor waveguide 20 are connected respectively to the input side and the output side of the SOA 18 formed on the semiconductor substrate 17, and also the output-side semiconductor waveguide 20 is provided with the folded-back portion 20a. With this configuration, respective ends of the input-side semiconductor waveguide 19 and the output-side semiconductor waveguide 20 exist on the same one end face of the semiconductor substrate 17 (end face 2d of the semiconductor chip 2B). Therefore, the semiconductor waveguide 19 and the semiconductor waveguide 20 connected to the input side and the output side of the SOA 18 can be aligned at one position and coupled to the optical waveguide 15 and the optical waveguide 16 of the PLC chip 3C, respectively. Thereby, alignment work and bonding work using the UV curable adhesive 8 are reduced and the fabrication of the hybrid integrated optical module 1B becomes easier, and also it is possible to realize a compact hybrid integrated optical module.

(3) In a typical silica-based optical waveguide of a planar lightwave circuit, the refractive index difference between the core and the clad configuring this optical waveguide is about several percent at a maximum, but, in a semiconductor waveguide, the refractive index difference between the core and the clad configuring this waveguide can be made to have a large value as exceeding 10 percent. The curvature radius of the folded-back portion when the waveguide is folded-back (curved waveguide) can be made smaller as the refractive index difference becomes larger between the core and the clad.

In the present embodiment, the folded-back portion 20a is provided to the output-side semiconductor waveguide 20 formed on the semiconductor substrate 17 and thereby it is possible to keep a low loss even when the curvature radius of the folded-back portion 20a is made smaller. Accordingly, comparing to a case in which a folded-back waveguide is fabricated on the silica-based planar lightwave circuit, the size of the element (semiconductor chip 2B) can be reduced greatly and it is possible to realize a more compact hybrid integrated optical module.

Fourth Embodiment

Figure 10:
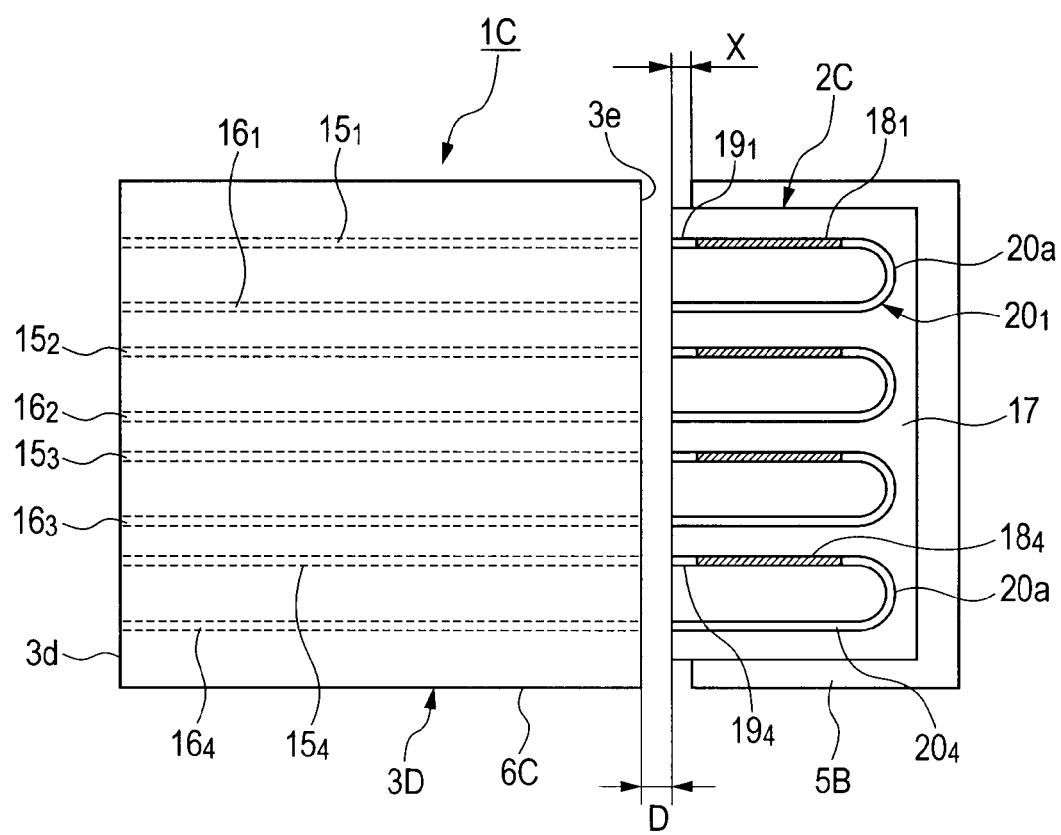
FIG. 10 is a plan view showing a basic configuration of a hybrid integrated optical module according to a fourth embodiment of the present invention.

FIG. 10 shows an outline configuration of a hybrid integrated optical module 1C according to a fourth embodiment.

This hybrid integrated optical module 1C has a plurality of semiconductor optical amplifiers (SOA) arranged in an array as elements on the semiconductor substrate 17 in the above hybrid integrated optical module 1B shown in FIG. 7. In the present embodiment, four semiconductor optical amplifiers (SOA) $18_1$ to $18_4$, for example, are arranged on the semiconductor substrate 17 in an array. Note that the hybrid integrated optical module 1C may have a configuration in which N SOAs, $18_1$ to $18_N$, are arranged on the semiconductor substrate 17 in an array.

Further, input-side semiconductor waveguides $19_1$ to $19_4$ respectively connected to the input sides of the SOAs $18_1$ to $18_4$ and output-side semiconductor waveguides $20_1$ to $20_4$ respectively connected to the output sides of the SOAs $18_1$ to $18_4$ are formed on the semiconductor substrate 17. Each of the output-side semiconductor waveguides $20_1$ to $20_4$ has a folded-back portion 20a folded-back on the semiconductor substrate 17.

Further, four sets of optical waveguide each set having two linear optical waveguides, $15_1$, $16_1$ to $15_4$, $16_4$, are formed on a PLC substrate 6C of a PLC chip 3D corresponding to the semiconductor waveguides $19_1$ to $19_4$ and $20_1$ to $20_4$, respectively. Each of these four sets of optical waveguides extends from one end face 3d of the PLC chip 3D to the other end face 3e thereof.

The other configuration is the same as that of the above hybrid integrated optical module 1B shown in FIG. 7.

(Hybrid Integrated Optical Module with a Fiber Array)

Next, a manufacturing method of a hybrid integrated optical module 1D with a fiber array in which a fiber array is added to the hybrid integrated optical module 1 shown in FIG. 1 will be explained with reference to FIGS. 11A to 11E.

Figure 11A:
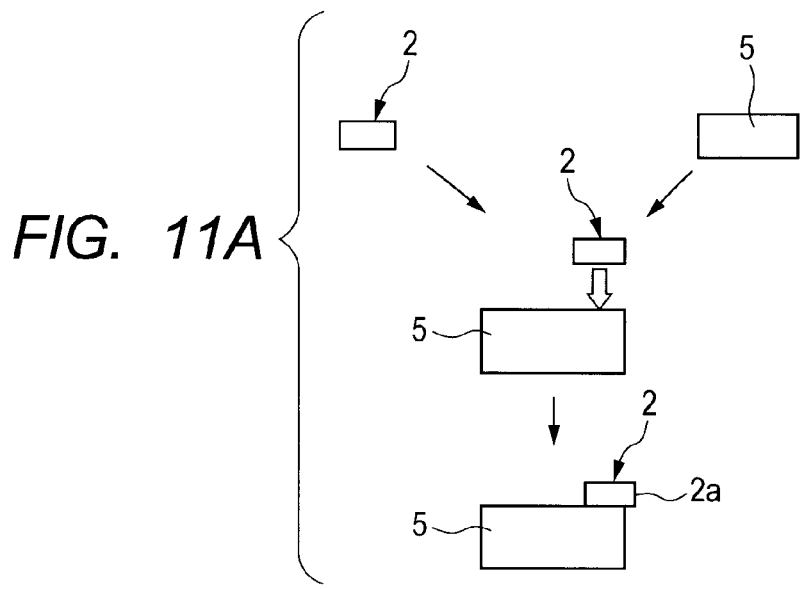
FIG. 11A to FIG. 11E are explanatory diagrams showing a manufacturing method of a hybrid integrated optical module with a fiber array according to an embodiment of the present invention.

(Step 1) First, as shown in FIG. 11A, die bonding (solder mounting) to bond the semiconductor chip 2 onto the Si bench 5 so that the end face 2a of the semiconductor chip 2 protrudes from the end face 5a of the Si bench 5 toward the PLC 3 side by a protrusion amount X.

Figure 11B:
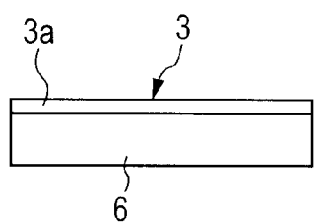

(Step 2) Before, after, or in parallel to above (Step 1), the PLC chip 3 is fabricated (refer to FIG. 11B).

(Step 3) Next, a glass lid 40 is fixed on the upper surface of the PLC chip 3 on one end side, and the glass lid 40 and the PLC chip 3 are cut obliquely on the one end side to form a slanted end face for preventing the return of reflected light (refer to 11C).

Figure 11C:
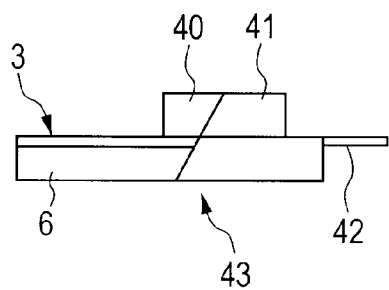

(Step 4) The slanted end face is polished and a slanted end face of a ferrule 42 of the fiber array 41 is bonded onto the slanted end face of the PLC chip 3 (refer to FIG. 11C).

Before this bonding, alignment is performed between the optical waveguide of the PLC chip 3 (e.g., optical waveguide 7 shown in FIG. 1) and an optical fiber 42 of the fiber array 41. In this manner, a PLC module 43 shown in FIG. 11C is fabricated.

Figure 11D:
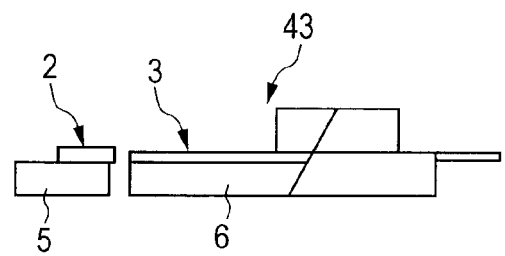

(Step 5) Next, the Si bench 5 and the PLC module 43 are fixed onto different stages, respectively, and the Si bench 5 and the PLC module 43 are moved relatively in the Z direction and the end face 2a of the semiconductor chip 2 is brought into contact with the end face 3a of the PLC chip 3 (refer to FIG. 11D). This contact position is set to be a reference position (zero point).

(Step 6) Next, the Si bench 5 and the PLC module 43 are moved relatively in the Z direction and the semiconductor chip 2 is moved by a distance D in the reverse direction from the reference position to perform the gap adjustment (refer to FIG. 11D).

(Step 7) Next, active alignment is performed between the semiconductor waveguide 4 (refer to FIG. 1) of the semiconductor chip 2 and the optical waveguide 7 (refer to FIG. 1) of the PLC chip 3.

Figure 11E:
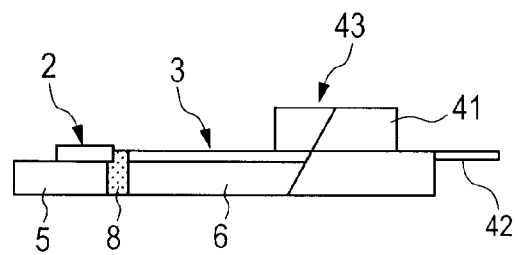

(Step 8) Next, the UV curable adhesive 8 is filled between the semiconductor chip 2 and the PLC chip 3, and between the Si bench 5 and the PLC substrate 6, and the UV curable adhesive 8 is irradiated with UV light and the UV curable adhesive is cured (refer to FIG. 11E).

In this manner, the semiconductor waveguide 4 of the semiconductor chip 2 and the optical waveguide 7 of the PLC chip 3 are separated by a certain distance to be coupled with each other, and the hybrid integrated optical module 1D with a fiber array where the semiconductor chip 2 and the PLC module 43 are integrated is fabricated.

According to the present invention, the end face of the first waveguide device having the semiconductor waveguide protrudes from the end face of the first substrate, and thereby it becomes possible to perform gap adjustment between the semiconductor waveguide and the waveguide of the second waveguide device (Z direction distance adjustment) by setting a position where the end face of the first waveguide device and the end face of the second waveguide device are brought into contact with each other to be a reference position (zero point). Thereby, it is possible to realize a hybrid integrated optical module having a high coupling efficiency by suppressing the connection loss between the waveguides.

According to the present invention, it is possible to perform the accurate gap adjustment between the semiconductor waveguide device and the waveguide of the second waveguide device when integrating the first waveguide device having the semiconductor waveguide and mounted on the first substrate and the second waveguide device. Accordingly, it is possible to realize a hybrid integrated optical module having a high coupling efficiency by suppressing the connection loss between the waveguides.

What is claimed is:

1. A hybrid integrated optical module, comprising:
   a first waveguide device having a waveguide and mounted on a first substrate; and
   a second waveguide device having a waveguide and mounted on a second substrate which is different from the first substrate, wherein
   the first waveguide device and the second waveguide device are integrated and the waveguide of the first waveguide device and the waveguide of the second waveguide device are separated by a certain distance to be optically coupled with each other,
   an end face of the first waveguide device, the end face being to be optically connected to the second waveguide device, protrudes from an end face of the first substrate,
   the second waveguide device is a planar lightwave circuit in which an optical waveguide as the waveguide of the second waveguide device is formed on the second substrate, and
   the first waveguide device and the second waveguide device, as well as the first substrate and the second substrate, are made to adhere to each other with UV curable adhesive, respectively.

2. The hybrid integrated optical module according to claim 1, wherein
   the first waveguide device is an end-face emission type semiconductor laser element or a waveguide type light receiving element, and
   a light output end face of the semiconductor laser element or a light incident end face of the light receiving element protrudes from the end face of the first substrate.

3. The hybrid integrated optical module according to claim 1, wherein
   the first waveguide device is a semiconductor waveguide element of a semiconductor optical amplifier or an electro-absorption modulator, and
   both opposed end faces of the semiconductor waveguide element protrude from both opposed end faces of the first substrate, respectively.

4. The hybrid integrated optical module according to claim 1, wherein
   the first waveguide device includes a semiconductor substrate mounted on the first substrate and an element having a semiconductor waveguide which is formed on the semiconductor substrate and can transmit light from an input side to an output side;
   an input-side semiconductor waveguide and an output-side semiconductor waveguide are connected to the input side and the output side of the element, respectively;
   one of the input-side and output-side semiconductor waveguides has a folded-back portion which is folded back on the semiconductor substrate;
   an end portion of the input-side semiconductor waveguide and an end portion of the output-side semiconductor waveguide exist on the same one end face of the semiconductor substrate; and
   the one end face of the semiconductor substrate protrudes from the end face of the first substrate.

5. The hybrid integrated optical module according to claim 4, wherein the element is a semiconductor waveguide element of a semiconductor optical amplifier or an electro-absorption modulator.

6. The hybrid integrated optical module according to claim 4, wherein a plurality of the elements is arranged in an array.

7. The hybrid integrated optical module according to claim 1, wherein an input/output optical fiber coupled with the waveguide of the second waveguide device on the second substrate is coupled to an end face opposite to an end face of the second substrate on the side facing the first substrate.

8. A manufacturing method of a hybrid integrated optical module which integrates a first waveguide device having a waveguide and mounted on a first substrate and a second waveguide device having a waveguide and mounted on a second substrate different from the first substrate, the method comprising the steps of:

mounting the first waveguide device on the first substrate so that one end face of the first waveguide device protrudes from one end face of the first substrate;

bringing the protruded end face of the first waveguide device into contact with one end face of the second waveguide device; and adjusting a distance between the waveguide of the first waveguide device and the waveguide of the second waveguide device, by setting a position where the respective end faces of the first and second waveguide devices are brought into contact with each other to be a reference position, and by moving the first waveguide device and the second waveguide device relatively from the reference position so as to separate the contacting end faces from each other.

\* \* \* \* \*